Feb. 19, 1952   S. J. RUBIN   2,586,721
UNIVERSAL MOUNTING FOR TRIPODS
Filed Feb. 19, 1949   2 SHEETS—SHEET 2
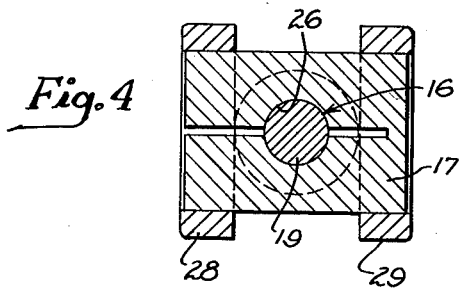
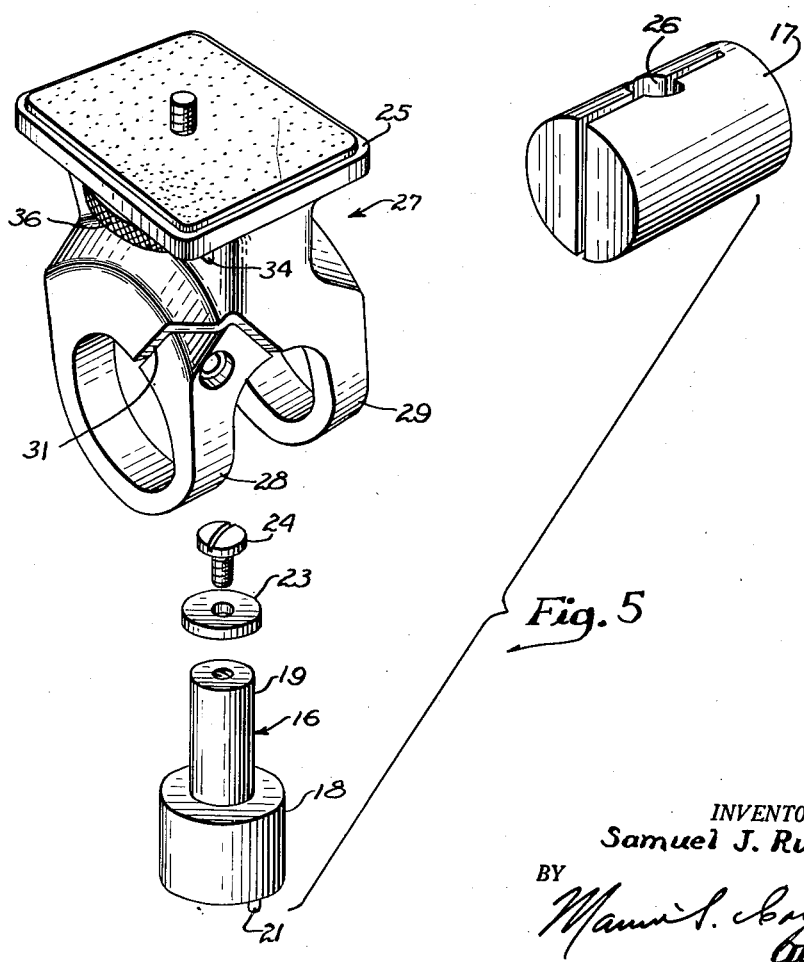
INVENTOR.
Samuel J. Rubin Patented Feb. 19, 1952

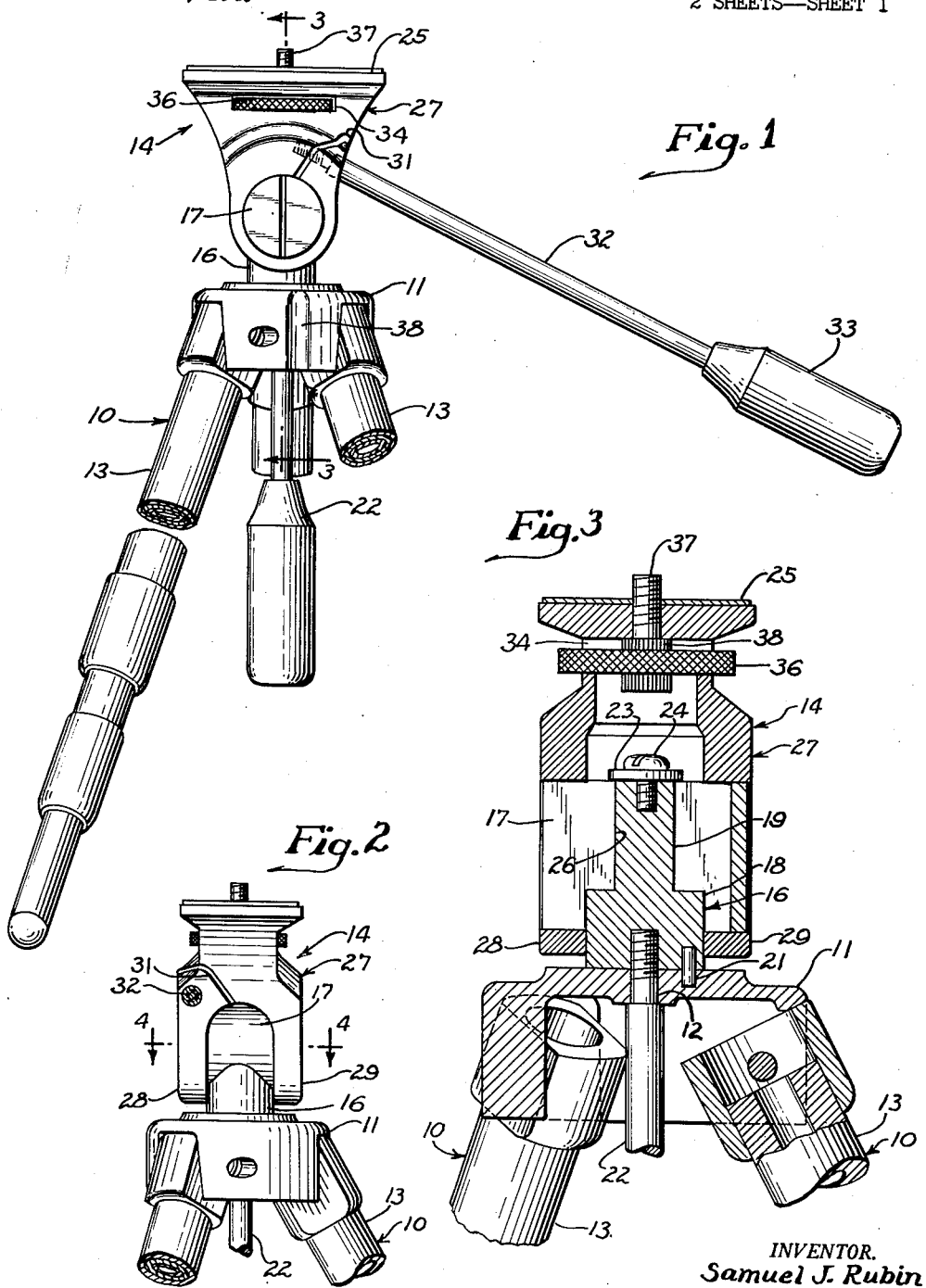

2,586,721

UNITED STATES PATENT OFFICE 2,586,721

UNIVERSAL MOUNTING FOR TRIPODS

Samuel J. Rubin, Chicago, Ill., assignor to Arrow Metal Products, Chicago, Ill., a copartnership Application February 19, 1949, Serial No. 77,320

9 Claims. (Cl. 248—183)

This invention relates to tripods and more particularly to a tripod having a universal mounting thereon for supporting a camera or other device whereby the camera or device may be adjusted in various desired positions.

One of the objects of my invention is the provision of a tripod having an adjustable support which may be readily and quickly operated to adjust a camera or other device in a desired position and in which the hand used by the operator for effecting the manual adjustment is also used to clamp the camera or other device in a rigid position.

Another object of my invention is the provision of a universal support for a tripod which operates smoothly when taking a panorama shot as with a movie camera so that no jerking is perceptible in the finished picture.

A further object of my invention is the provision of a device of the foregoing character which is efficient in operation, neat in appearance, compact in construction, comprised of few and simple parts, and economical to manufacture.

Other objects and advantages of my invention will appear more fully in the following description, and the invention resides in the novel features which will be particularly pointed out in the appended claims.

In the drawings:

Figure 1 is a side elevational view of an embodiment of my invention.

Figure 2 is a front elevational view thereof.

Figure 3 is a longitudinal sectional view on an enlarged scale taken on line 3—3 of Figure 1.

Figure 4 is a sectional view taken on line 4—4 of Figure 2.

Figure 5 is a composite perspective view showing the elements of my universal mounting in disassembled relation.

Referring to the drawings, the numeral 10 indicates a tripod of any approved design including a head 11 having a central aperture 12 and supporting legs 13 hingedly secured thereto. The universal mounting of my invention indicated generally by the numeral 14 is supported on the head 11 and comprises a vertical pivot 16 upon which is mounted a slotted horizontal pivot 17. The vertical pivot 16 is a stepped cylindrical member having an enlarged base portion 18 and a reduced upper portion 19. The base portion 18 is provided with a detent 21 receivable in a complemental hole in the head 11. The detent 21 serves to lock the pivot 16 against rotation relative to the head 11. The vertical pivot 16 is detachably secured to the head 11 of the tripod by a depending screw 22 and the horizontal pivot 17 is retained on the vertical pivot 16 by a washer 23 and screw 24. The horizontal pivot 17 is slotted longitudinally for the major portion of its length as shown in Figure 5 and the portions thereof on opposite sides of the slot are capable of limited flexing. The horizontal pivot 17 is transversely counterbored as at 26 to receive the vertical pivot 16.

A platform member indicated generally by the numeral 27 is formed with a supporting surface 25 and two integral depending collars 28 and 29 which embrace the ends of the horizontal pivot 17, one of said collars lying on each side of the vertical pivot 16. The collar 28 is slotted as indicated at 31 and is suitably threaded to receive an elongated screw 32 provided with an operating handle 33 adapted to constrict the collar 28. It will be seen that the slotted collar 28 embraces the slotted end of the horizontal pivot 17.

The platform member 27 is provided with a slot 34 under the supporting surface 25 in which is received the knurled wheel 36 associated with a screw 37 engageable with the camera or other device to be supported on the platform member. The knurled wheel 36 is of such size as to project beyond the edges of the slot 34 so as to be accesible for engagement and manipulation by the fingers of the operator. The screw 37 is provided with a head and an unthreaded body portion which in assembly is press fitted into the wheel 36. A shoulder 38 abuts the upper wall of the slot 34 while the wheel 36 rests on the lower wall of the side slot. Thus the screw 37 is mounted in proper horizontal disposition relative to the supporting surface 25 to facilitate attachment of a camera or other device to the platform member.

In operation tightening of the screw 32 operates to clamp the slotted collar 28 on the slotted end of the horizontal pivot 17. This action simultaneously draws the slotted portions of the horizontal pivot 17 together causing them to constrict and to tighten against the vertical pivot 16 thus locking the above elements against rotation either in a vertical or horizontal plane.

It will be apparent that the operator may grasp the handle 33 at the end of the screw 32 and move the platform member in a vertical or horizontal arc to a desired position and then, by twisting the screw 32 with the same hand, lock the platform member in a desired position of adjustment.

When it is desired to take a panorama shot as with a movie camera the screw 32 is manipulated to unlock the platform member which then may be swung smoothly either in a vertical or horizontal arc so that no jerkiness is perceptible in the finished picture.

A semi-circular groove 38 is provided in the head 11 to accommodate the shank of the screw 32 so as to permit more compact collapse of the tripod thus obviating the necessity for disengaging the operating screw 32. The parts are so proportioned that substantially 180° movement of the platform member 14 in a vertical arc may be effected.

It is to be understood that the from of my invention herewith shown and described is to be taken as a preferred example of the same, and that various changes in the shape, size and arrangement of parts may be resorted to, without departing from the spirit of my invention, or the scope of the appended claims.

I claim:

1. A mounting for cameras and the like comprising a support, a vertical pivot on the support, a horizontal pivot slotted the major portion of its length so as to comprise two spaced elements joined at one end pivotally mounted on said vertical pivot, a platform member including a supporting surface, a pair of collars depending from said surface and pivotally embracing the ends of said horizontal pivot, one of said collars being slotted and embracing the slotted end of said horizontal pivot, and manually controlled screw means for simultaneously constricting said slotted collar and said slotted horizontal pivot whereby to lock the said collar on said horizontal pivot and to lock said horizontal pivot on said vertical pivot.

2. A mounting for cameras and the like comprising a support, a vertical pivot on the support, a horizontal pivot pivotally mounted on said vertical pivot, said horizontal pivot having a diametral slot extending the major portion of its length so that said horizontal pivot comprises two spaced elements joined at one end said spaced elements being capable of limited flexing, a platform member including a supporting surface, a pair of collars depending from said surface and pivotally embracing the ends of said horizontal pivot, one of said collars being slotted and embracing the slotted end of said horizontal pivot, and manually controlled means for simultaneously constricting said slotted collar and said horizontal pivot whereby to lock said collar on said horizontal pivot and to lock said horizontal pivot on said vertical pivot.

3. A mounting for cameras and the like comprising a support, a vertical pivot on the support, a horizontal pivot including two elements joined at one end and embracing said vertical pivot, a platform member including a supporting surface, a pair of collars depending from said surface and pivotally embracing the ends of said horizontal pivot, one of said collars being slotted and embracing the unjoined end of said horizontal pivot, and manually controlled screw means for successively constricting said slotted collar and said horizontal pivot whereby to lock said collar on said horizontal pivot and to lock said horizontal pivot on said vertical pivot.

4. A mounting for cameras and the like comprising a support, a vertical pivot on the support, a horizontal pivot slotted the major portion of its length so as to comprise two spaced elements joined at one end pivotally mounted on said vertical pivot, a platform member including a supporting surface, a pair of collars depending from said surface and pivotally embracing the ends of said horizontal pivot, one of said collars being slotted and embracing the slotted end of said horizontal pivot and a single manually controlled means for constricting said slotted collar whereby to lock said slotted collar on said horizontal pivot and said horizontal pivot on said vertical pivot.

5. A mounting for cameras and the like comprising a support, a vertical pivot on said support, a horizontal pivot pivotally mounted on said vertical pivot and having a slot extending longitudinally from one end for a major portion of its length with the slot lying in the plane of the longitudinal axis of said vertical pivot so that said horizontal pivot comprises two spaced elements joined at one end, a platform member including a supporting surface, a pair of collars depending from said surface, one of said collars being slotted, said collars embracing the ends of said horizontal pivot with the slotted collar embracing the slotted end of said horizontal pivot, and a single manually controlled means for constricting said slotted collar whereby to lock said collar on said horizontal pivot and said horizontal pivot on said vertical pivot.

6. A mounting for cameras and the like comprising a support, a vertical pivot on the support, a slotted horizontal pivot pivotally mounted on said vertical pivot, a platform member including a supporting surface, a pair of collars depending from said surface and pivotally embracing the ends of said horizontal pivot, one of said collars being slotted and embracing the slotted end of said horizontal pivot, manually controlled screw means for simultaneously constricting said slotted collar and said horizontal pivot slotted the major portion of its length so as to comprise two spaced elements joined at one end whereby to lock the said collar on said horizontal pivot and to lock said horizontal pivot on said vertical pivot, said platform member having a slot in a plane below said supporting surface and a central aperture in said surface, and a rotatable screw projecting upwardly through said aperture and having an enlarged finger engaging portion fixed thereto and received in said slot.

7. In a mounting for cameras and the like having a support and a vertical pivot on the support, a horizontal pivot pivotally mounted on said vertical pivot, said horizontal pivot comprising two spaced elements joined at one end, and means for constricting said horizontal pivot onto said vertical pivot.

8. In a swivel mounting having a support and a vertical pivot on the support, a horizontal pivot slotted the major portion of its length so as to comprise two spaced elements joined at one end, said horizontal pivot being pivotally mounted on said vertical pivot.

9. In a swivel mounting having a support and a vertical pivot on the support, a horizontal pivot slotted the major portion of its length so as to comprise two spaced elements joined at one end, said horizontal pivot being pivotally mounted on said vertical pivot, and means for tightening said horizontal pivot on said vertical pivot.

SAMUEL J. RUBIN.

REFERENCES CITED

The following references are of record in the file of this patent:

UNITED STATES PATENTS

| Number | Name | Date |
|---|---|---|
| 1,854,951 | Neuwirth | Apr. 19, 1932 |
| 2,143,606 | Mooney | Jan. 10, 1939 |

OTHER REFERENCES

Publication by Quick-Set, Inc., 1735 Diversey Parkway, Chicago, Ill. (Copy in Div. 52.)